(12) United States Patent
Hoke et al.

(10) Patent No.: US 11,036,242 B2
(45) Date of Patent: Jun. 15, 2021

(54) CALIBRATION DATA GENERATION APPARATUS, CALIBRATION DATA GENERATION METHOD, AND FLOW RATE CONTROL DEVICE

(71) Applicant: HORIBA STEC, Co., Ltd., Kyoto (JP)

(72) Inventors: Thomas Hoke, Irvine, CA (US); Patrick Lowery, Irvine, CA (US); Bill White, Irvine, CA (US); John Dick, Irvine, CA (US); Tadahiro Yasuda, Irvine, CA (US); Tomohiro Yoshida, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 231 days.

(21) Appl. No.: 16/232,970

(22) Filed: Dec. 26, 2018

(65) Prior Publication Data

US 2019/0196517 A1 Jun. 27, 2019

(30) Foreign Application Priority Data

Dec. 27, 2017 (JP) .............................. JP2017-252455

(51) Int. Cl.
*G05D 7/06* (2006.01)
*G01F 1/66* (2006.01)
(Continued)

(52) U.S. Cl.
CPC ......... *G05D 7/0635* (2013.01); *F16K 37/005* (2013.01); *F16K 37/0041* (2013.01);
(Continued)

(58) Field of Classification Search
CPC .... F16K 37/0083; F16K 37/0041; F16K 1/12; F16K 31/007; Y10T 137/8242
See application file for complete search history.

(56) References Cited

U.S. PATENT DOCUMENTS

| 4,132,272 | A | * | 1/1979 | Holloway | ............ | A01B 63/114 |
| | | | | | | 172/2 |
| 5,165,448 | A | * | 11/1992 | Handte | ................. | F15B 13/043 |
| | | | | | | 137/625.62 |

(Continued)

FOREIGN PATENT DOCUMENTS

JP 2017072216 A 4/2017

*Primary Examiner* — John Fitzgerald
*Assistant Examiner* — Truong D Phan
(74) *Attorney, Agent, or Firm* — Alleman Hall Creasman & Tuttle LLP (57) ABSTRACT

A calibration data generation apparatus includes a flow rate sensor that measures the flow rate of a fluid flowing through a fluid control valve; a differential pressure control mechanism; a temperature control mechanism; and a control unit that when the fluid passing has sound velocity, uses the temperature control mechanism to change the temperature from a reference temperature to comparative temperature. In addition, the control unit includes a valve opening control part that controls the fluid control valve so that at the comparative temperature, an output value outputted from one of the position sensor and the flow rate sensor becomes equal to the reference output value of the one; and a calibration data generation part that generates the calibration data on the basis of a calibration data generation output value outputted from the other one of the position sensor and the flow rate sensor.

8 Claims, 8 Drawing Sheets

(51) Int. Cl.
*F16K 37/00* (2006.01)
*G01F 5/00* (2006.01)
*G01L 27/00* (2006.01)

(52) U.S. Cl.
CPC .................. *G01F 1/66* (2013.01); *G01F 5/00* (2013.01); *G01L 27/002* (2013.01)

(56) References Cited

U.S. PATENT DOCUMENTS

| | | | | |
|---|---|---|---|---|
| 5,197,508 | A * | 3/1993 | Gottling | F16K 11/04 137/1 |
| 6,155,283 | A * | 12/2000 | Hansen | G05B 13/042 137/1 |
| 6,237,624 | B1 * | 5/2001 | Neumair | F15B 11/028 137/505.41 |
| 2010/0139775 | A1 * | 6/2010 | Ohmi | G01F 7/005 137/12 |
| 2011/0048556 | A1 * | 3/2011 | Carter | G01D 21/00 137/559 |
| 2011/0220071 | A1 * | 9/2011 | Horiba | F02M 25/0836 123/520 |
| 2014/0374634 | A1 * | 12/2014 | Ohtsuki | F16K 31/007 251/129.06 |
| 2016/0025765 | A1 * | 1/2016 | Panther | G01P 15/00 702/150 |
| 2017/0082467 | A1 * | 3/2017 | Nelson | F16K 37/0083 |

* cited by examiner

CALIBRATION DATA GENERATION APPARATUS, CALIBRATION DATA GENERATION METHOD, AND FLOW RATE CONTROL DEVICE

TECHNICAL FIELD

The present invention relates to a calibration data generation apparatus, a calibration data generation method, and a flow rate control device.

BACKGROUND ART

In the past, as a fluid control device for controlling the flow rate of fluid to be supplied to a deposition chamber in a semiconductor manufacturing process, for example, as disclosed in Patent Literature 1, there has been one including: a fluid control valve provided with a position sensor that outputs an output value corresponding to the position of a valve closure member moving in a contacting/separating direction with respect to a valve seat; and a flow rate sensor that measures the flow rate of fluid.

This fluid control device is configured to control the valve opening of the fluid control valve on the basis of the output value of the position sensor so that the output value of the flow rate sensor comes close to a predetermined target value.

However, when the temperature of the fluid flowing through the fluid control valve becomes high, respective members constituting the fluid control valve are deformed due to the effect of heat, and this causes the problem that a deviation occurs between the output value of the position sensor and an actual valve opening and thereby the flow rate cannot be accurately controlled. In particular, when as the position sensor, using an eddy current sensor adapted to detect the relative position of the valve closure member to the valve seat of the fluid control valve, the eddy current sensor itself is affected by the temperature in addition to the above cause, and the resulting deviation becomes significant.

Meanwhile, in the past, in order to generate calibration data for calibrating the deviation between the output value of the position sensor and the actual valve opening caused by temperature change, with a shim interposed between the valve seat and the valve closure member to keep the valve opening constant, the output value of the position sensor has been acquired while changing the temperature of the fluid control valve.

However, such a method has had the problem that reassembling the fluid control valve is required every time the shim is replaced, and since the valve opening is adjusted using the shim, the valve opening can be adjusted only stepwise, thus failing to acquire detailed calibration data.

CITATION LIST

Patent Literatures

Patent Literature 1: Japanese Unexamined Patent Application Publication No. 2017-72216

SUMMARY OF INVENTION

Technical Problem

Therefore, the main object of the present invention is to provide a calibration data generation apparatus and calibration data generation method capable of generating calibration data in a non-step manner without reassembling a fluid control valve.

Solution to Problem

That is, the calibration data generation apparatus according to the present invention is one that generates calibration data for calibrating a position sensor that is installed in a fluid control valve for controlling fluid and outputs a value corresponding to the position of a valve closure member moving in a contacting/separating direction with respect to a valve seat, and includes: a flow rate sensor that measures the flow rate of the fluid flowing through the fluid control valve; a differential pressure control mechanism that controls the differential pressure between the upstream and downstream sides of the fluid control valve; a temperature control mechanism that controls the temperature of the fluid control valve; and a control unit that in a state where the differential pressure control mechanism controls the differential pressure so that the fluid passing through the fluid control valve has sound velocity, uses the temperature control mechanism to change the temperature from a reference temperature to comparative temperature different from the reference temperature. In addition, the control unit includes: an output value acquisition part that acquires reference output values at the reference temperature, which are respectively outputted from the position sensor and the flow rate sensor; a valve opening control part that controls the valve opening of the fluid control valve so that in a state where the temperature control mechanism controls the temperature to the comparative temperature, an output value outputted from a first sensor of the position sensor and the flow rate sensor becomes equal to the reference output value of the first sensor; and a calibration data generation part that after the valve opening control part has controlled the valve opening of the fluid control valve, generates the calibration data on the basis of a calibration data generation output value outputted from a second sensor of the position sensor and the flow rate sensor, the flow rate sensor being the first sensor and the position sensor being the second sensor in a first embodiment, and the position sensor being the first sensor and the flow rate sensor being the second sensor in a second embodiment.

Since such a calibration data generation apparatus creates a state where the fluid flows through the fluid control valve at sound velocity, i.e., a state where the fluid flows at a constant flow rate when the valve opening of the fluid control valve is the same, changes the temperature of the fluid control valve in this state, and from the output values of the position sensor and flow rate sensor before and after the temperature change, generates the calibration data for calibrating the effect of the temperature change on the position sensor, the calibration data for the position data can be generated without reassembling the fluid control valve. In addition, the deviation of the output value of the position sensor from the output value at the reference temperature caused by the temperature change from the reference temperature includes: a deviation (hereinafter also referred to as a first deviation) caused by thermal effect on the position sensor itself due to the temperature change; and a deviation (hereinafter also referred to as a second deviation) caused by thermal effect on respective members constituting the fluid control valve (specifically, thermal expansion of the respective members) due to the temperature change. Further, according to the present invention, the calibration data indicating the relationship between temperature change and the deviation of the output value of the position sensor from the output value at the reference temperature, which includes the first deviation due to the temperature change (specifically, the deviation of the output value of the position sensor from the output value at the reference temperature, which includes the first deviation due to the temperature change but does not include part or all of the second deviation) can be extracted. Still further, by controlling the valve opening of the fluid control valve, the valve opening can be adjusted in a non-step manner, and in doing so, detailed calibration data can be acquired. In addition, as the reference temperature it is only necessary to select temperature (e.g., normal temperature 25° C.) that is unlikely to cause the positional deviation between the output value of the position sensor and an actual valve opening. Also, the calibration data includes data indicating the relationship between temperature change from the reference temperature and the deviation of the output value of the position sensor from the output value at the reference temperature caused by the temperature change, data indicating the relationship between a temperature compensation coefficient for correcting the above relationship and temperature, and the like.

Specifically, the valve opening control part may be one that controls the valve opening of the fluid control valve so that an output value outputted from the flow rate sensor becomes equal to the reference output value of the flow rate sensor, and the calibration data generation part may be one configured to generate the calibration data on the basis of a calibration data generation output value outputted from the position sensor and the reference output value of the position sensor. Also, the control unit may further include a theoretical expression storage part that stores a theoretical expression representing the relationship among the flow rate of the fluid flowing through the fluid control valve, the valve opening of the fluid control valve, and a temperature compensation coefficient for the valve opening, wherein the valve opening control part may be one that controls the valve opening of the fluid control valve so that an output value outputted from the position sensor becomes equal to the reference output value of the position sensor, and the calibration data generation part may be one configured to generate the calibration data on the basis of a calibration data generation output value outputted from the flow rate sensor, the valve opening of the fluid control valve at the reference temperature that is predetermined, and the theoretical expression.

Further, the differential pressure control mechanism may be one including a pressure control device that is arranged upstream of the fluid control valve and can control pressure on the upstream side to keep the pressure constant. In addition, the flow rate sensor may be one arranged upstream of the pressure control device.

Also, the calibration data generation apparatus may further include a sound velocity sensing mechanism that senses whether the fluid flowing through the fluid control valve reaches the sound velocity, and the sound velocity sensing mechanism may be one including: a chamber installed on the downstream side of the fluid control valve; a pressure sensor that measures pressure inside the chamber; and a sound velocity sensing part that when after the fluid has been introduced into the chamber that was depressurized, the increase rate of a pressure value measured by the pressure sensor becomes constant, senses that the fluid flowing through the fluid control valve reaches the sound velocity.

Such a calibration data generation apparatus can accurately grasp a state where the fluid flows through the fluid control valve at a constant flow rate.

Also, a control program used for a calibration data generation apparatus according to the present invention is one that generates calibration data for a position sensor that is installed in a fluid control valve for controlling fluid and outputs an output value corresponding to the position of a valve closure member moving in a contacting/separating direction with respect to a valve seat, and the calibration data generation apparatus includes: a flow rate sensor that measures the flow rate of the fluid flowing through the fluid control valve; a differential pressure control mechanism that controls the differential pressure between the upstream and downstream sides of the fluid control valve; a temperature control mechanism that controls the temperature of the fluid control valve; and a control unit that in a state where the differential pressure control mechanism controls the differential pressure so that the fluid passing through the fluid control valve has sound velocity, uses the temperature control mechanism to change the temperature from a reference temperature to comparative temperature different from the reference temperature. In addition, the control program: acquires reference output values at the reference temperature, which are respectively outputted from the position sensor and the flow rate sensor; in a state where the temperature control mechanism controls the temperature to the comparative temperature, controls the valve opening of the fluid control valve so that an output value outputted from a first sensor of the position sensor and the flow rate sensor becomes equal to the reference output value of the first sensor; and then generates the calibration data on the basis of a calibration data generation output value outputted from the other one of the position sensor and the flow rate sensor, the flow rate sensor being the first sensor and the position sensor being the second sensor in a first embodiment, and the position sensor being the first sensor and the flow rate sensor being the second sensor in a second embodiment. Further, the calibration data generation method for a position sensor according to the present invention is one that generates calibration data for a position sensor that is installed in a fluid control valve for controlling fluid and detects a value corresponding to the position of a valve closure member moving in a contacting/separating direction with respect to a valve seat. In addition, the calibration data generation method includes: changing the temperature of the fluid control valve from a reference temperature to comparative temperature difference from the reference temperature to acquire reference output values at the reference temperature, which are respectively outputted from the position sensor and a flow rate sensor for measuring the flow rate through the fluid control valve in a state where the differential pressure between the upstream and downstream sides of the fluid control valve is controlled so that the fluid passing through the fluid control valve has sound velocity; controlling the valve opening of the fluid control valve so that an output value outputted from a first sensor of the position sensor and the flow rate sensor becomes equal to the reference output value of the first sensor in a state where the fluid control valve is kept at the comparative temperature; and generating the calibration data on the basis of a calibration data generation output value outputted from a second sensor of the position sensor and the flow rate sensor after the valve opening of the fluid control valve has been controlled, the flow rate sensor being the first sensor and the position sensor being the second sensor in a first embodiment, and the position sensor being the first sensor and the flow rate sensor being the second sensor in a second embodiment.

Still further, the flow rate control device according to the present invention includes a fluid control valve that controls fluid; a flow rate sensor that measures the flow rate of the fluid flowing through the fluid control valve; a temperature sensor that measures the temperature of the fluid control valve; and a flow rate control unit that performs control so that a flow rate measurement value measured by the flow rate sensor comes close to a predetermined flow rate target value. In addition, the flow rate control unit includes: a calibration data storage part that stores calibration data indicating the relationship between the temperature change of the temperature sensor from a predetermined reference temperature and the deviation of the output value of a position sensor from an output value at the reference temperature, which is caused by the temperature change; and a valve opening control part that refers to the output value of the temperature sensor to calibrate a calibration data generation output value of the position sensor with the calibration data, and on the basis of the calibrated output value, controls the valve opening of the fluid control valve.

Since such a flow rate control device can calibrate the deviation between the output value of the position sensor and the position of a valve closure member with respect to an actual valve seat, which is caused by the temperature change, and control the flow rate, it becomes possible for the fluid control valve to more accurately control the flow rate of the fluid.

Advantageous Effects of Invention

The calibration data generation apparatus and calibration data generation method according to the present invention configured as described above are capable of, without reassembling the fluid control valve, generating detailed calibration data by adjusting the valve opening of the fluid control valve in a non-step manner.

DESCRIPTION OF EMBODIMENTS

In the following, the calibration data generation apparatus according to the present invention will be described on the basis of the drawings.

The calibration data generation apparatus 100 according to the present invention is one that generates calibration data for calibrating a position sensor PS of a fluid control valve 300 included in a fluid control device 200 for controlling the supply amount of fluid (material gas) to be supplied to, for example, a deposition chamber or the like in a semiconductor manufacturing process. Note that in a first embodiment, after describing the fluid control valve 300, a procedure for generating the calibration data for the position sensor PS by the calibration data generation apparatus 100 is described, and finally, the fluid control device 200 is described.

First Embodiment

Figure 1:
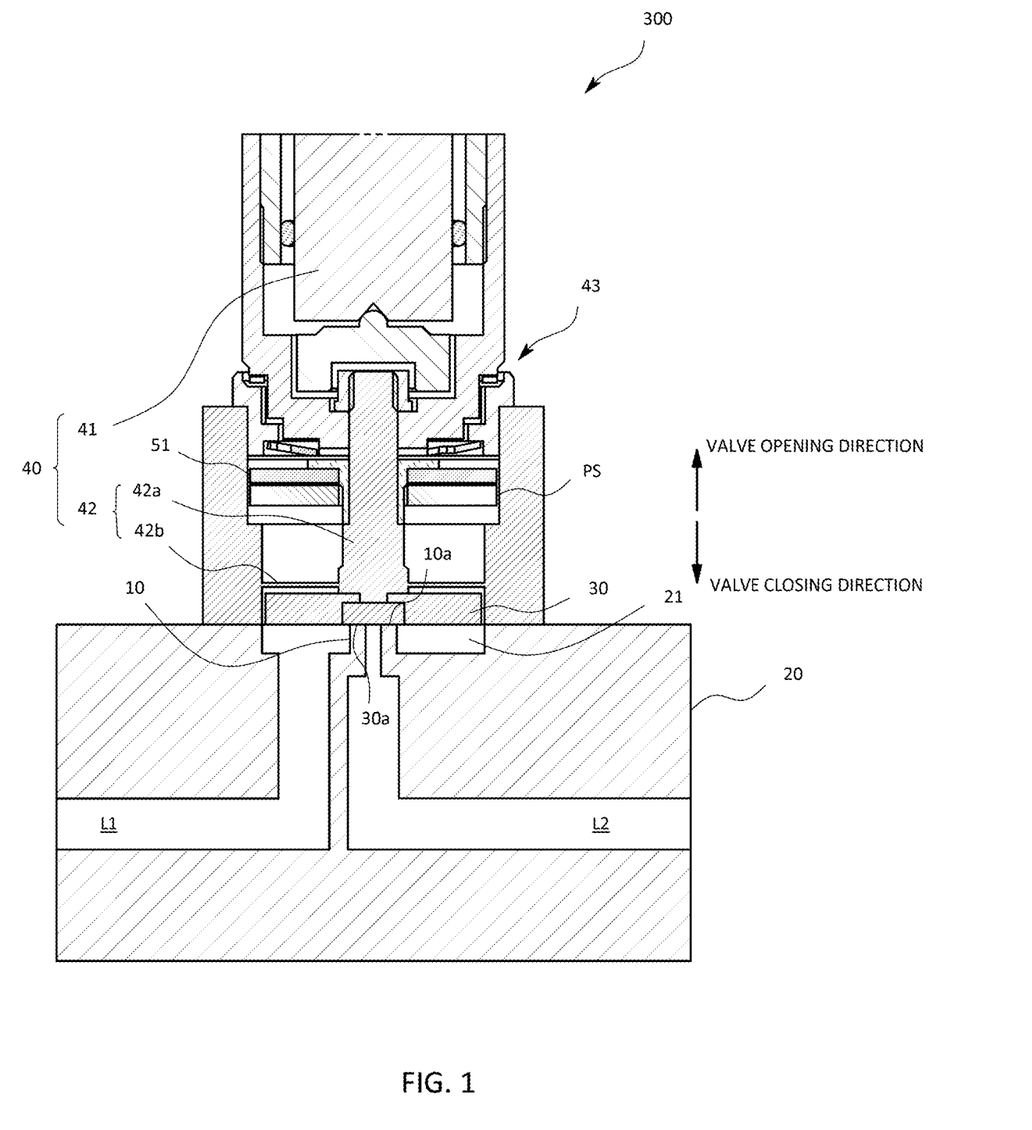
FIG. 1 is a schematic diagram illustrating a fluid control valve according to a first embodiment.

The fluid control valve 300 according to the present embodiment is one of, for example, a normally closed type. Specifically, the fluid control valve 300 includes: a block body 20 provided with a valve seat 10; a valve closure member 30 that is seated on the valve seat 10; and an actuator 40 that drives the valve closure member 30 to change a valve opening. In addition, the valve opening indicates the separation distance between the valve seat 10 and the valve closure member 30. Further, the valve closure member 30 includes a seating surface 30a that is seated on a valve seat surface 10a of the valve seat 10 provided on the block body 20.

The block body 20 is provided on one surface thereof with the valve seat 10. Specifically, the block body 20 is provided with a concave part 21 formed by annularly cutting the one surface thereof, and a part protruding from the center of the concave part 21 serves as the valve seat 10. In the concave part 21, one end of an upstream side flow path L1 extending to the upstream side is opened, and in the valve seat 10, one end of a downstream side flow path L2 extending to the downstream side is opened. In addition, a surface of the valve seat 10 in which the downstream side flow path L2 is opened serves as the valve seat surface 10a.

The actuator 40 includes: for example, a piezo stack 41 formed by stacking multiple piezo elements; and an operating body 42 that is moved by elongation of the piezo stack 41. In addition, the piezo stack 41 is connected to the operating body 42 via a displacement reversing mechanism 43 adapted to reversely transmit the movement caused by the elongation of the piezo stack 41. Further, the operating body 42 includes: a plunger 42a connected to the valve closure member 30; and a diaphragm member 42b provided around the plunger 42a.

This configuration allows the piezo stack 41 in the fluid control valve 300 to be elongated by applying voltage to the piezo stack 41. In addition, the elongated movement is reversely transmitted to the operating body 42 via the displacement reversing mechanism 43, and the operating body 42 moves the valve closure member 30 in a valve opening direction. As a result, the valve seat surface 10a and the seating surface 30a are separated by a distance corresponding to the voltage applied to the piezo stack 41, and consequently form a gap. Further, the upstream side flow path L1 and the downstream side flow path L2 communicate with each other through the gap. Note that the valve closure member 30 is in a closed state when no voltage is applied to the piezo stack 41.

Also, the fluid control valve 300 is installed with the position sensor PS that outputs an output value corresponding to the relative position of the seating surface 30a to the valve seat surface 10a. Note that the output value corresponding to the relative position refers to the relative distance between the valve seat surface 10a and the seating surface 30a or to a value related to the relative distance.

The position sensor PS is attached to any one of the valve closure member 30 or a member that moves together with the valve closure member 30 (e.g., the plunger 42 in the present embodiment) and a stationary member that is stationary with respect to such members. In addition, the position sensor PS in the present embodiment is an eddy current sensor. The eddy current sensor is attached to the stationary member side. Further, the plunger 42 as a member that moves together with the valve closure member 30 is attached with an electrically conductive target 51 facing the eddy current sensor in the contacting/separating direction (moving direction) of the valve closure member 30 with respect to the valve seat 10. Accordingly, the eddy current sensor senses the distance to the target 51.

Next, the calibration data generation apparatus 100 that generates the calibration data for calibrating the position sensor PS of the fluid control valve 300 will be described.

Figure 2:
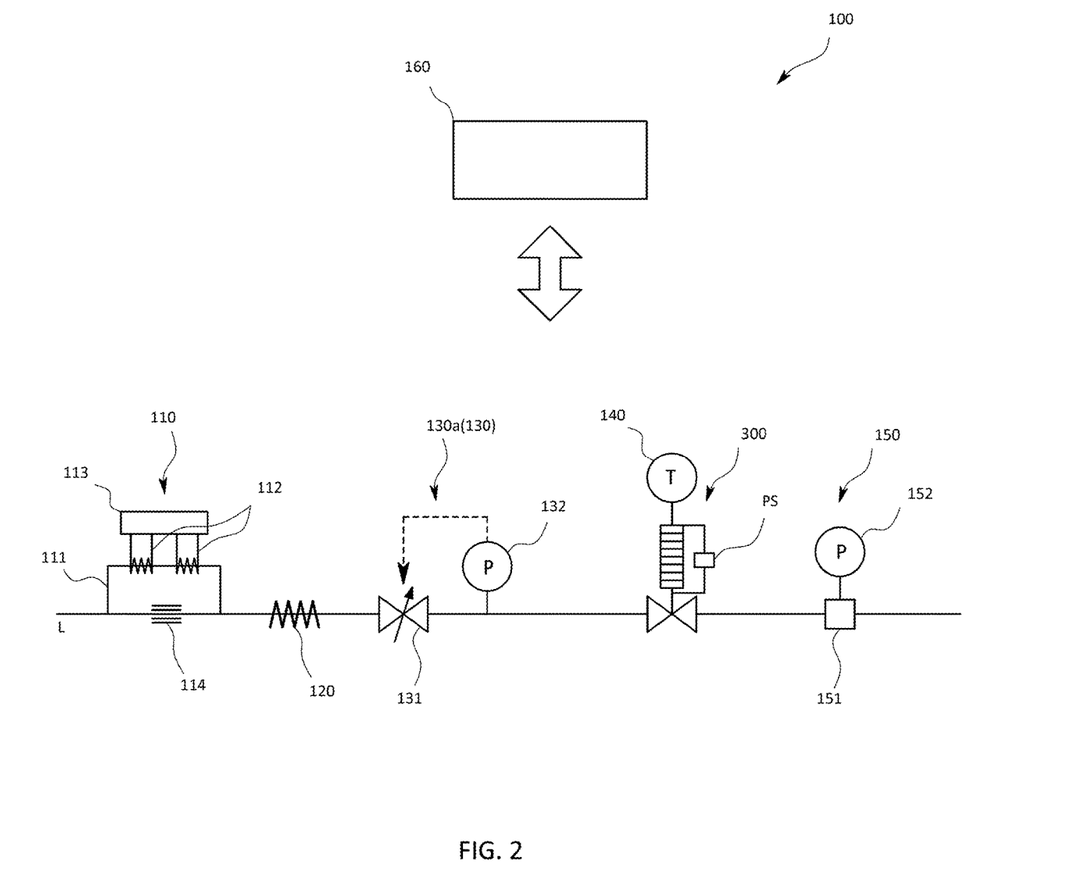
FIG. 2 is a schematic diagram illustrating a calibration data generation apparatus according to the first embodiment.

As illustrated in FIG. 2, the calibration data generation apparatus 100 according to the present invention includes: a flow rate sensor 110 that measures the flow rate of the fluid flowing through the fluid control valve 300; a temperature control mechanism 120 that controls the temperature of the fluid control valve 300; a differential pressure control mechanism 130 that controls the differential pressure between the upstream and downstream sides of the fluid control valve 300; a temperature sensor 140 that measures the temperature of the fluid control valve 300; and a sound velocity sensing mechanism 150 that senses that the flow rate of the fluid flowing through the fluid control valve 300 reaches sound velocity.

The flow rate sensor 110, temperature control mechanism 120, differential pressure control mechanism 130, temperature sensor 140, and sound velocity sensing mechanism 150 are installed from the upstream side toward the downstream side of the flow path L in this order. Also, the fluid control valve 300 is replaceably connected to the flow path L between the differential pressure control mechanism 130 and the sound velocity sensing mechanism 140. In addition, although not illustrated, the upstream end of the flow path L is connected to a fluid supply device, and the downstream end of the flow path L is connected to a depressurizing pump.

The flow rate sensor 110 is a thermal type mass flow rate sensor. Specifically, the flow rate sensor 110 includes: a flow rate measuring tube 111 that bypasses the flow path L; and a pair of heat generating resistance wires 112 wound on the upstream and downstream sides of the flow rate measuring tube 111. In addition, the flow rate sensor 110 further includes a flow rate calculation part 113 that calculates the flow rate value of the fluid flowing through the flow rate measuring tube 111 on the basis of the temperature difference between the pair of heat generating resistance wires 112 and 112 caused by the flow of the fluid through the flow rate measuring tube 111. The flow rate calculation part 113 calculates the mass flow rate of the fluid flowing through the flow path L on the basis of the split flow ratio between the flow path L and the flow rate measuring tube 111. Also, between the branching point to and the merging point from the flow rate measuring tube 111 in the flow path L, a laminar flow element 114 is provided.

The temperature control mechanism 120 is a heater consisting of an electrically heated wire wound on a pipe constituting the flow path L, and the like. In addition, the temperature control mechanism 120 controls the temperature rise of the fluid control valve 300 by controlling the heating temperature of the fluid flowing into the fluid control valve 300.

The differential pressure control mechanism 130 is one that controls the differential pressure between the upstream and downstream sides of the fluid control valve 300 to keep it constant. Specifically, the differential pressure control mechanism 130 includes a pressure control mechanism 130a arranged upstream of the fluid control valve 300. In addition, the pressure control mechanism 130a includes a pressure control valve 131 for controlling the pressure of the fluid and a first pressure sensor 132 for measuring the pressure of the fluid. Further, the pressure control valve 131 is feedback-controlled so that a pressure value measured by the first pressure sensor 132 becomes equal to a predetermined target pressure value.

The temperature sensor 140 is one that measures the temperature or ambient temperature of the fluid control valve 300. In addition, the temperature sensor 140 may be attached to the fluid control valve 300 itself or attached around the fluid control valve 300. In the latter case, the temperature sensor 140 only has to be provided in a casing (not illustrated) surrounding the fluid control valve 300.

The sound velocity sensing mechanism 150 is one that senses that the velocity of the fluid flowing through the fluid control valve 300 reaches sound velocity. Specifically, the sound velocity sensing mechanism 150 includes: a chamber 151 that is installed on the downstream side of the fluid control valve 300; and a second pressure sensor 152 that measures the pressure inside the chamber 151. In addition, the sound velocity sensing mechanism 150 is configured to, when the fluid flows from the fluid control valve 300 into the chamber 151 depressurized, and a pressure rise rate in the chamber 151 measured by the second pressure sensor 152 becomes constant, determine that the velocity of the fluid flowing through the fluid control valve 300 reaches sound velocity.

Also, the calibration data generation apparatus 100 further includes a control unit 160. The control unit 160 has a so-called computer including a CPU, a memory, A/D and D/A converters, an input/output part, and the like, and is configured to implement respective functions by executing a program stored in the memory to make various devices cooperate.

Figure 3:
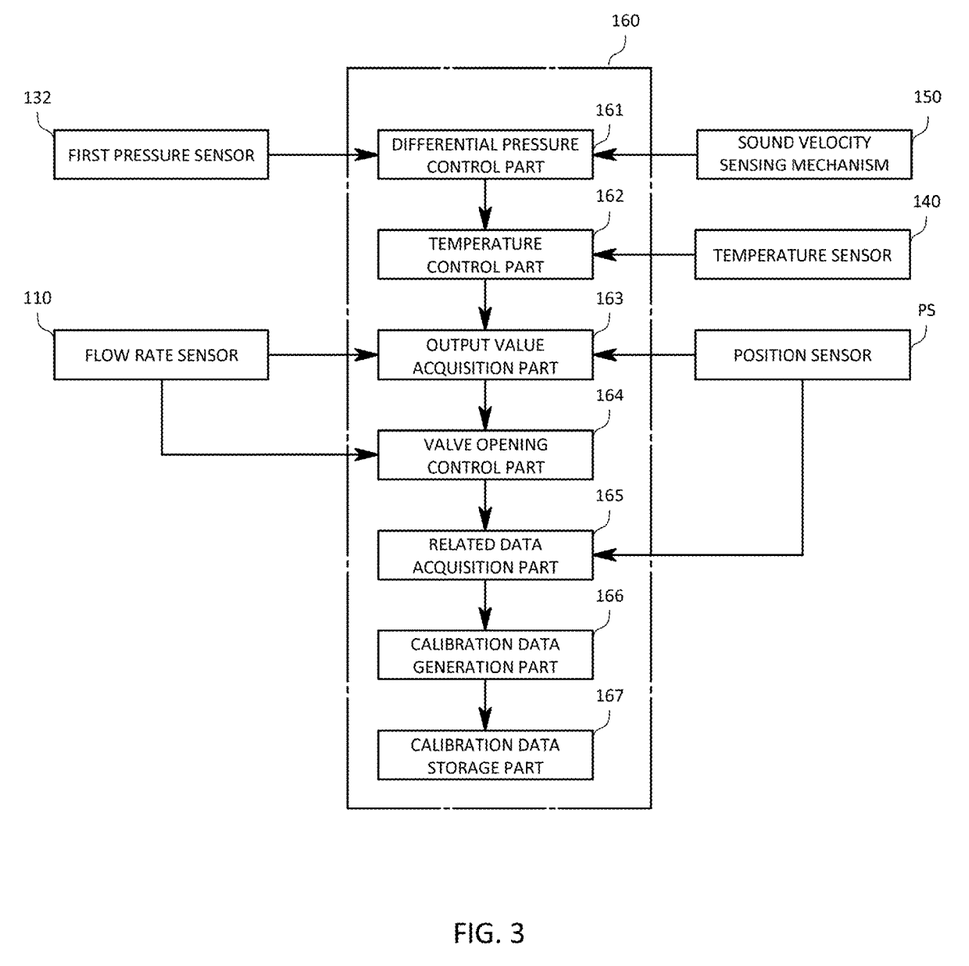
FIG. 3 is a block diagram illustrating a control unit of the calibration data generation apparatus according to the first embodiment.

Specifically, as illustrated in FIG. 3, the control unit 160 includes: a differential pressure control part 161 that uses the differential pressure control mechanism 130 to control the differential pressure between the upstream and downstream sides of the fluid control valve 300; a temperature control part 162 that uses the temperature control mechanism 120 to control the temperature of the fluid control valve 300; an output value acquisition part 163 that uses the temperature control part 162 to acquire the output values of the position sensor PS and flow rate sensor 110 at a reference temperature; a valve opening control part 164 that controls the valve opening of the fluid control valve 300 so as to return an output value outputted from the flow rate sensor 110 to the output value before temperature change; a related data acquisition part 165 that acquires related data relating a calibration data generation output value detected by the position sensor PS after the valve opening control part 164 has controlled the valve opening and comparative temperature to each other; a calibration data generation part 166 that generates the calibration data on the basis of the related data acquired by the related data acquisition part 165; and a calibration data storage part 167 that stores the calibration data generated by the calibration data generation part 166 in the memory.

The differential pressure control part 161 is one that uses the pressure control mechanism 130a to raise pressure on the upstream side of the fluid control valve 300, and thereby generates differential pressure between the upstream and downstream sides of the fluid control valve 300. In addition, the pressure control mechanism 130a is configured to refer to the pressure value measured by the first pressure sensor 132 and feedback-control the pressure control valve 131. Further, after the sound velocity sensing mechanism 150 has sensed that the flow rate of the fluid flowing through the fluid control valve 300 has reached sound velocity, the differential pressure control part 161 is adapted to use the pressure control mechanism 130a to keep the pressure on the upstream side of the fluid control valve 300 constant and keep the differential pressure constant. Note that when the velocity of the fluid flowing through the fluid control valve 300 reaches sound velocity, the flow rate of the fluid flowing through the fluid control valve 300 does not increase any more but stays constant.

The temperature control part 162 is one that in a state where the differential pressure control part 161 has controlled the velocity of the fluid flowing through the fluid control valve 300 to sound speed, i.e., in a state where the differential pressure control part 161 keeps the flow rate of the fluid flowing through the fluid control valve 300 constant, heats the fluid flowing into the fluid control valve 300 to change the temperature of the fluid control valve 300. Specifically, the temperature control part 162 is configured to refer to a temperature value measured by the temperature sensor 140 and perform feedback control so as to change the temperature from the reference temperature set to normal temperature or near the normal temperature to the comparative temperature different from the reference temperature.

The output value acquisition part 163 is one that when the temperature control part 162 controls the temperature of the fluid control valve 300 to the reference temperature, acquires reference output values respectively outputted from the position sensor PS and the flow rate sensor 110 at the reference temperature.

The valve opening control part 164 is one that in a state where the temperature control part 162 controls the temperature of the fluid control valve 300 to the comparative temperature, controls the valve opening of the fluid control valve 300 so that an output value outputted from the flow rate sensor 110 returns to the reference output value. Specifically, the valve opening control part 164 is configured to refer to the output value of the flow rate sensor 110 and feedback-control the valve opening of the fluid control valve 300.

The related data acquisition part 165 is one that after the valve opening control part 164 has controlled the valve opening, acquires the related data relating an output value outputted from the position sensor PS and comparative temperature to each other.

Figure 5:
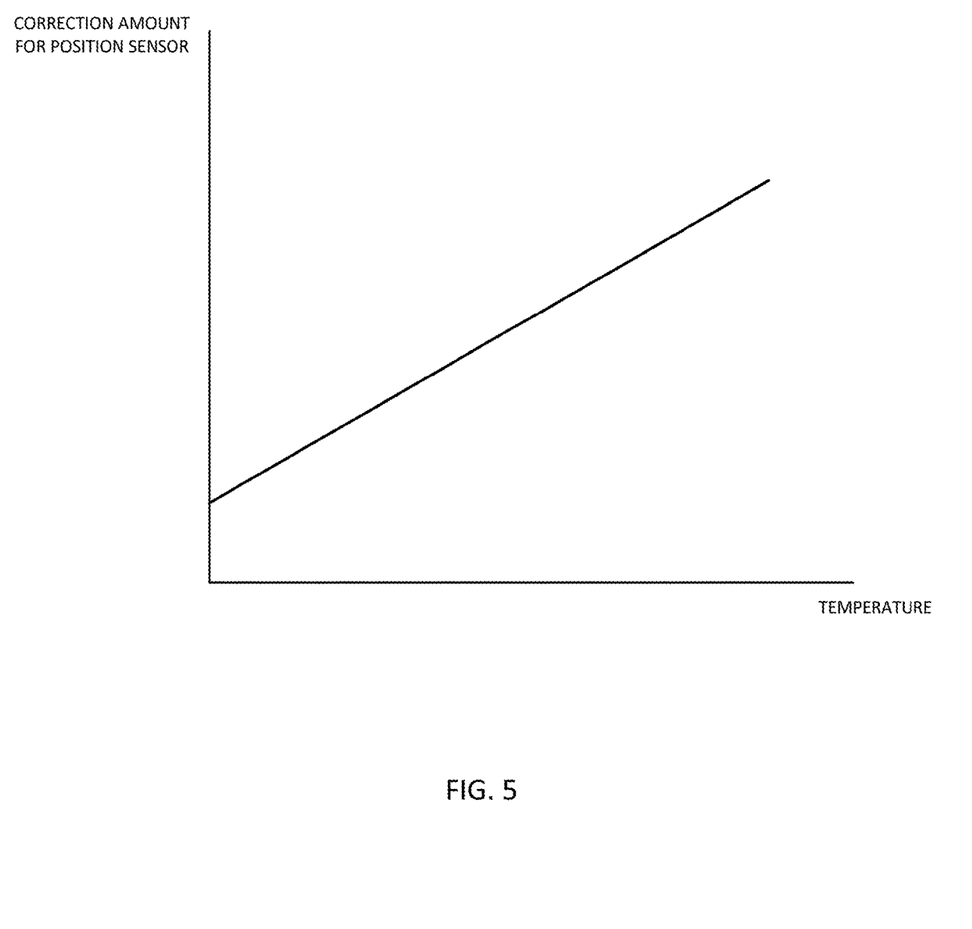
FIG. 5 is a graph illustrating an example of calibration data according to the first embodiment.

The calibration data generation part 166 is one that changes the comparative temperature and generates calibration data on the basis of related data obtained for each changed comparative temperature and the reference output value. In addition, as the calibration data, for example, as illustrated in FIG. 5, a calibration curve having a substantially proportional relationship between a correction amount for correcting the deviation of the calibration data generation output value of the position sensor PS included in related data from the reference output value and temperature is obtained. Further, the calibration data generated by the calibration data generation part 166 is stored in the calibration data storage part 167.

Figure 4:
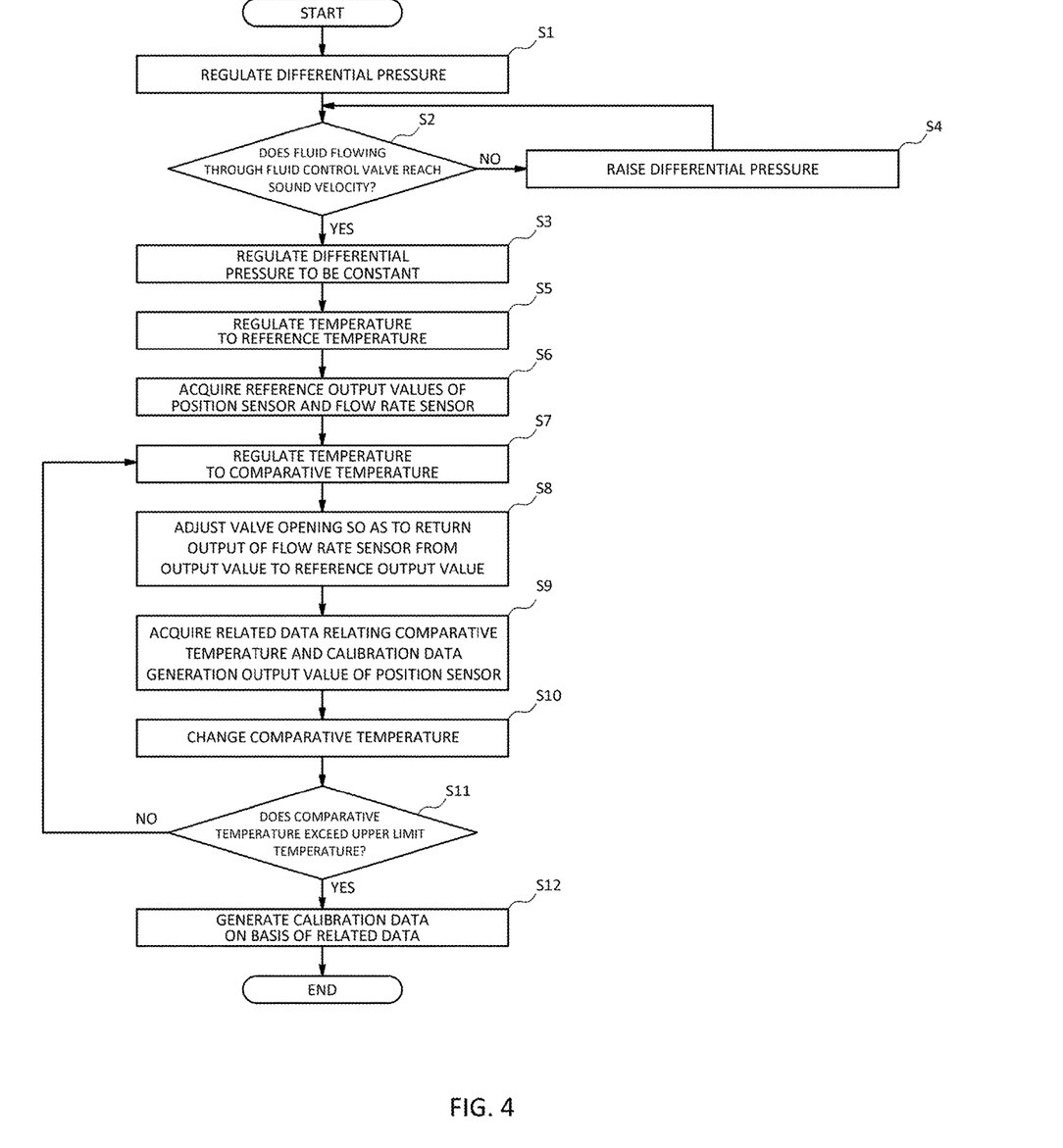
FIG. 4 is a flowchart illustrating the operation of the calibration data generation apparatus according to the first embodiment.

Next, the operation of the calibration data generation apparatus 100 will be described.

The valve opening of the fluid control valve 300 is adjusted to an initial valve opening near fully closing. Then, when an operation signal is inputted from an input part to the calibration data generation apparatus, the differential pressure control part 161 raises the pressure on the upstream side of the fluid control valve 300, and thereby increases the pressure difference between the upstream and downstream sides of the fluid control valve 300 (Step S1). After that, when the sound velocity sensing mechanism 150 senses that the velocity of the fluid flowing through the fluid control valve 300 reaches sound velocity, the differential pressure control part 161 keeps the pressure on the upstream side of the fluid control valve 300 constant, and keeps the differential pressure between the upstream and downstream sides of the fluid control valve 300 constant (Steps S2 and S3). On the other hand, when the sound velocity sensing mechanism 150 does not sense that the velocity of the fluid flowing through the fluid control valve 300 reaches sound velocity, the differential pressure control part 161 further raises the pressure on the upstream side of the fluid control valve 300, and thereby further increases the pressure difference between the upstream and downstream sides of the fluid control valve 300 (Steps S2 and S4).

Subsequently, in a state where the differential pressure control part 161 keeps the differential pressure between the upstream and downstream sides of the fluid control valve 300 constant, i.e., in a state where the differential pressure control part 161 keeps the flow rate of the fluid flowing into the fluid control valve 300 constant, the temperature control part 162 controls the fluid flowing into the fluid control valve 300 to regulate the temperature of the fluid control valve 300 to the reference temperature (Step S5). In this state, the output value acquisition part 163 acquires the reference output values of the position sensor PS and flow rate sensor 110 at the reference temperature (Step S6). Then, the temperature control part 162 controls the temperature of the fluid flowing into the fluid control valve 300 to regulate the temperature of the fluid control valve 300 to the comparative temperature (Step S7). Note that in this state, the output value of the position sensor PS deviates from the output value at the reference temperature, and the deviation includes two types of deviations caused by the rise from the reference temperature to the comparative temperature, i.e., a first deviation caused by thermal effect on the position sensor PS itself; and a second deviation caused by thermal expansion of respective members constituting the fluid control valve 300.

Subsequently, the valve opening control part 164 controls the valve opening of the fluid control valve 300 so that an output value outputted from the flow rate sensor 110 returns to the reference output value (Step S8). In this state, the related data acquisition part 166 acquires the related data relating the calibration data generation output value outputted from the position sensor PS and the comparative temperature (Step S9). Note that in the calibration data generation output value, the second deviation is cancelled, and only the first deviation is included. This is the result of utilizing the principle that when matching the output values of the flow rate sensor 110 with each other with the fluid flowing through the fluid control valve 300 kept at sound velocity, the valve openings of the fluid control valve 300 become the same. Accordingly, the related data is data relating the calibration data generation output value including only the first deviation and the comparative temperature to each other.

Then, Steps S7 to S9 are repeated while increasing the comparative temperature until the comparative temperature reaches an upper limit temperature, and thereby the related data is acquired for each comparative temperature (Steps S10 and S11). Finally, when the comparative temperature reaches the upper limit temperature, the calibration data generation part 167 generates the calibration data on the basis of the related data (Step S12).

The above operation is repeated while gradually increasing the initial valve opening of the fluid control valve 300 from near fully closing to near fully opening, and thereby the calibration data is generated for each valve opening.

The fluid control valve 300 for which the calibration data has been generated by the calibration data generation apparatus 100 is detached from the calibration data generation apparatus 100, and installed in the flow rate control device 200.

Figure 6:
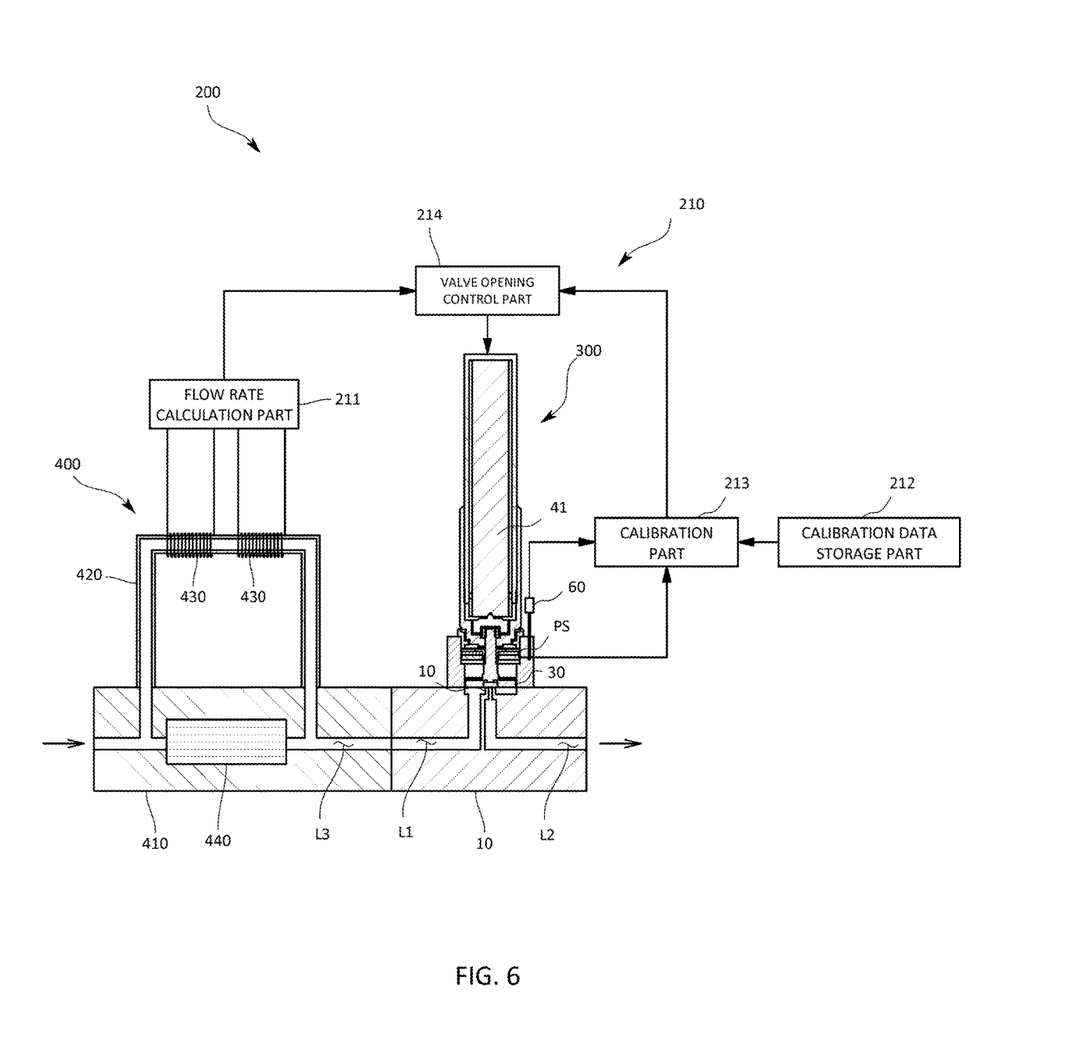
FIG. 6 is a schematic diagram illustrating a flow rate control device according to the first embodiment.

Next, the flow rate control device 200 will be described.

The flow rate control device 200 is a so-called mass flow controller. Specifically, as illustrated in FIG. 6, the flow rate control device 200 includes: the fluid control valve 300 for which the calibration data has been generated by the calibration data generation apparatus 100; and a flow rate sensor 400 that measures the flow rate of the fluid flowing into the fluid control valve 300. Also, the fluid control valve 300 is connected with a temperature sensor 60.

The flow rate sensor 400 is a thermal type mass flow rate sensor. Specifically, the flow rate sensor 400 includes: a block body 410 provided with a flow path L3; a flow rate measuring tube 420 that bypasses the flow path L3; and a pair of heat generating resistance wires 430 wound on the upstream and downstream sides of the flow rate measuring tube 420. Also, between the branching point to and the merging point from the flow rate measuring tube 420 in the flow path L3, a laminar flow element 440 is provided.

In addition, the flow rate control device 200 is formed by connecting both of the block bodies 20 and 410 so as to communicate the flow path L1 of the fluid control valve 300 and the flow path L3 of the flow rate sensor 400 to each other.

Further, the flow rate control device 200 includes a flow rate control unit 210 that controls the fluid control valve 300 so that a flow rate value measured by the flow rate sensor 400 comes close to a predetermined flow rate target value. The flow rate control unit 210 has a so-called computer including a CPU, a memory, A/D and D/A converters, an input/output part, and the like, and is adapted to implement respective functions by executing a program stored in the memory to make various devices cooperate.

Specifically, the flow rate control unit 210 includes: a flow rate calculation part 211 that calculates the flow rate of the fluid flowing through the flow path L3 on the basis of a signal outputted from the flow rate sensor 400; a calibration data storage part 212 that stores the calibration data for the position sensor PS generated by the calibration data generation apparatus 100; a calibration part 213 that calibrates an output value detected by the position sensor PS on the basis of a temperature value measured by the temperature sensor 60 and the calibration data; and a valve opening control part 214 that controls the valve opening of the fluid control valve 300 on the basis of a calibrated output value resulting from the calibration by the calibration part 213 so that a flow rate value calculated by the flow rate calculation part 211 comes close to the predetermined flow rate target value.

In addition, the valve opening control part 214 is one that has a storage part that stores an expression representing the relationship between a flow rate through the fluid control valve 300 and the valve opening of the fluid control valve 300 and reference data indicating the relationship between the output value of the position sensor PS at a predetermined reference temperature and the valve opening, and refers to the reference data to obtain a valve opening corresponding to the calibrated output value, substitutes the valve opening into the expression to calculate a flow rate, and controls the fluid control valve 300 so that the flow rate comes close to the flow rate target value. In addition, map data indicating the relationship between the flow rate through the fluid control valve 300 and the valve opening of the fluid control valve 300 may be stored in the storage part, and the map data may be used instead of the expression. Further, by calculating the flow rate from the output of the position sensor PS as described above, for example, even when the output of the flow rate sensor 400 is delayed in time, such as at the time of a flow rate rise or fall, the flow rate through the fluid control valve 300 can be estimated. For this reason, at the time of the fall or rise when flow rate control is likely to be delayed, on the basis of the deviation between the flow rate calculated from the opening of the fluid control valve 300 and the flow rate target value, the valve opening control part 214 feedback-controls the fluid control valve 300. On the other hand, after the flow rate has been stabilized at the flow rate target value, on the basis of the deviation between the flow rate measured by the flow rate sensor 400 and the flow rate target value, the valve opening control part 214 feedback-controls the fluid control valve 300. In doing so, response speed at the initial time of the flow rate control can be increased, and also after the flow rate has been stabilized, robust control against disturbance can be achieved.

The flow rate calculation part 211 calculates the flow rate of the fluid flowing through the flow rate measuring tube 420 on the basis of the temperature difference between the pair of heat generating resistance wires 430 caused by the flow of the fluid through the flow rate measuring tube 420, and on the basis of the split flow ratio between the flow path L and the flow rate measuring tube 111, calculates a mass flow rate through the flow path L.

Next, the operation of the flow rate control device 200 will be described.

When an operation signal is inputted to the flow rate control device 200, the flow rate calculation part 211 calculates the flow rate of the fluid flowing through the flow path L3 on the basis of temperature difference caused between the pair of heat generating resistance wires 430. Then, the valve opening control part 214 controls the valve opening so that a flow rate value calculated by the flow rate calculation part 211 comes close to the predetermined flow rate target value. In this case, the calibration part 213 calibrates an output value detected by the position sensor PS on the basis of a temperature value measured by the temperature sensor 60 and the calibration data, and successively transmits the resulting calibrated output value to the valve opening control part 214, and the valve opening control part 214 controls the valve opening on the basis of the calibrated output value.

Second Embodiment

The present embodiment is a variation of the calibration data generation apparatus 100 according to the first embodiment. Specifically, the device configuration of the calibration data generation apparatus 100 according to the first embodiment remains the same. However, the control unit 160 is different, and as a result, a procedure for generating calibration data is also different.

Figure 7:
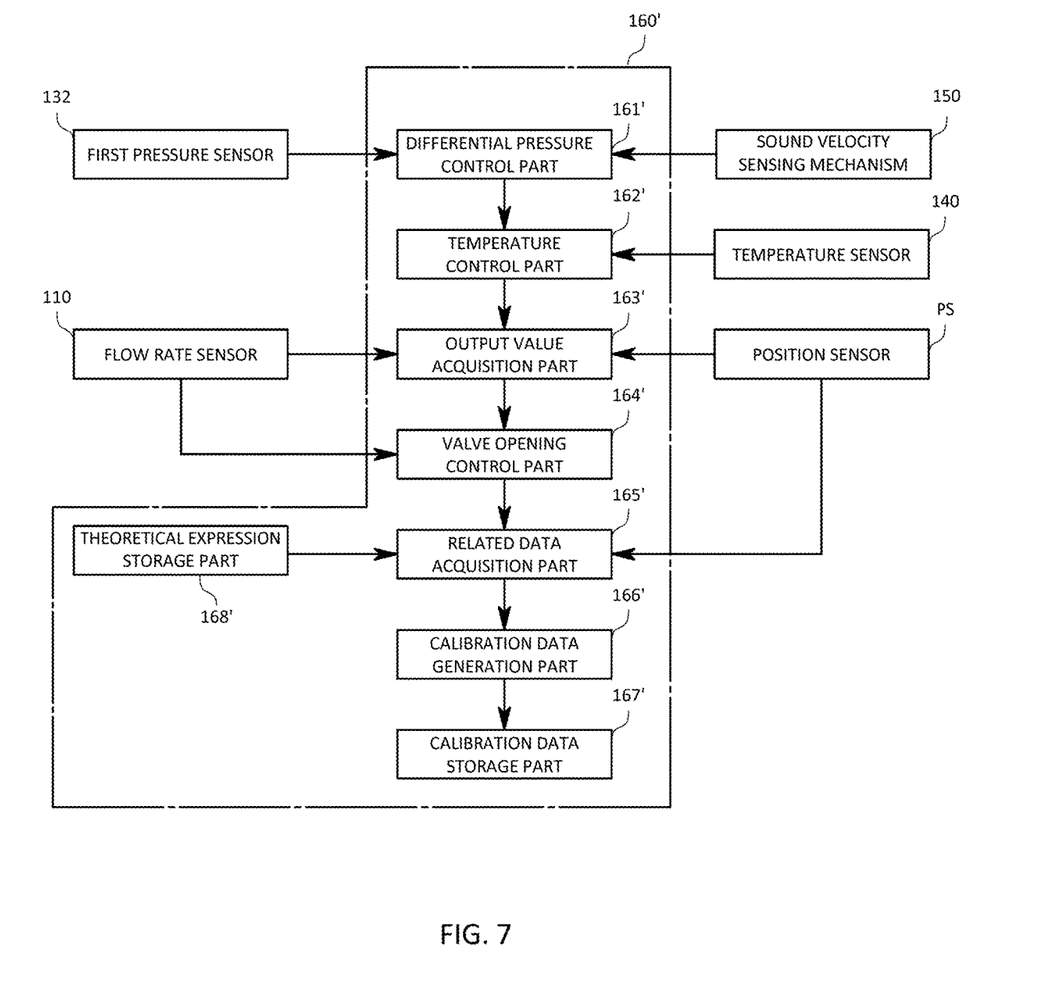
FIG. 7 is a block diagram illustrating a control unit of a calibration data generation apparatus according to a second embodiment.

As illustrated in FIG. 7, a control unit 160' of the calibration data generation apparatus 100 according to the present embodiment includes: a differential pressure control part 161' that uses the differential pressure control mechanism 130 to control the differential pressure between the upstream and downstream sides of the fluid control valve 300; a temperature control part 162' that uses the temperature control mechanism 120 to control the temperature of the fluid control valve 300; an output value acquisition part 163' that uses the temperature control part 162' to acquire the output values of the position sensor PS and flow rate sensor 110 at the reference temperature; a valve opening control part 164' that controls the valve opening of the fluid control valve 300 so as to return an output value outputted from the position sensor PS to the output value before temperature change; a theoretical expression storage part 168' that stores a theoretical expression representing the relationship between the flow rate of the fluid flowing through the fluid control valve 300 and the valve opening of the fluid control valve 300; a related data acquisition part 165' that on the basis of a calibration data generation output value outputted from the flow rate sensor 110 after the valve opening control part 164' has controlled the valve opening and the theoretical expression, acquires related data relating comparative temperature and a temperature compensation coefficient for correcting the output value of the position sensor PS at the comparative temperature; a calibration data generation part 166' that generates calibration data on the basis of the related data acquired by the related data acquisition part 165'; and a calibration data storage part 167' that stores the calibration data generated by the calibration data generation part 166' in the memory. In addition, the differential pressure control part 161', the temperature control part 162', the output value acquisition part 163', and the calibration data storage part 167' respectively have the same functions as those of the corresponding parts in the first embodiment.

The valve opening control part 164' is one that in a state where the temperature control part 162' controls the temperature to the comparative temperature, controls the valve opening of the fluid control valve 300 so that the output value outputted from the position sensor PS returns to the reference output value. Specifically, the valve opening control part 164' is configured to refer to the output value of the position sensor PS and feedback-control the valve opening of the fluid control valve 300.

The theoretical expression storage part 168' is one that stores the theoretical expression representing an ideal model for the fluid control valve 300. In addition, as an example of the theoretical expression, an expression obtained from Expressions (1) and (3) below is conceivable.

That is, a mass flow rate ṁ through the fluid control valve 300 can be calculated from Expression (1).

$$\dot{m} = \rho v A_{flow} \quad (1)$$

Here, $\rho$ represents fluid density, $v$ fluid velocity, and $A_{flow}$ an effective total flow rate area.

In addition, the effective total flow rate area $A_{flow}$ is represented by Expression (2).

$$A_{flow} = \pi C_d D_o \Delta h \quad (2)$$

Here, $C_d$ represents a discharge coefficient (Note: The discharge coefficient has an empirical numerical value representing the performance of an orifice, and is represented as a function of the Reynolds number. Also, the discharge coefficient can be regarded as substantially constant throughout a flow rate range.), $D_o$ the opening diameter of the valve seat, and $\Delta h$ the valve opening (the distance between the valve seat surface of the valve seat and the seating surface of the valve closure member).

As can be seen from Expression (2), the effective total flow rate area $A_{flow}$ is a tubular area formed by extending the opening end edge of the valve seat to the seating surface of the valve closure member. Specifically, in the present embodiment, the opening end edge of the valve seat is of a circular shape, and the effective total flow rate area $A_{flow}$ is a cylindrical area formed by extending the opening end edge to the seating surface of the opposite valve closure member.

Further, considering temperature change, the effective total flow rate area $A_{flow}$ can be represented by Expressions (3) and (4).

$$A_{flow} = \pi {}^* C_d {}^* D_o [1 + \alpha \Delta T] {}^* [\Delta h {}^* h_T(\Delta T)] \quad (3)$$

$$\Delta T = T_a - T_{cal} \quad (4)$$

Here, $\alpha$ represents the thermal expansion of metal forming the valve seat, $h_T(\Delta T)$ the temperature compensation coefficient, $T_\alpha$ actual temperature, and $T_{cal}$ the reference temperature. In addition, the discharge coefficient $C_d$, and the opening diameter $D_o$ of the valve seat have known values, and the thermal expansion a of the metal forming the valve seat has an accurately predictable value.

The related data acquisition part 165' is one that acquires the related data relating the temperature compensation coefficient obtained by substituting the output value outputted from the flow rate sensor 110 after the valve opening control part 164' has controlled the valve opening and the value of a reference valve opening at the predetermined reference temperature into the theoretical expression and the comparative temperature to each other. In addition, as the value of the reference valve opening, the value of $\Delta h$ obtained by substituting the output value of the flow rate sensor 110 into Expressions (1) and (2) above in a state where the fluid control valve 300 is kept at the reference temperature can be used.

The calibration data generation part 166' is one that changes the comparative temperature to generate the calibration data on the basis of the related data obtained for each comparative temperature. In addition, as the calibration data, for example, a calibration curve having a substantially proportional relationship between the temperature compensation coefficient and temperature is obtained. Further, the calibration data generated by the calibration data generation part 166' is stored in the calibration data storage part 167'

Figure 8:
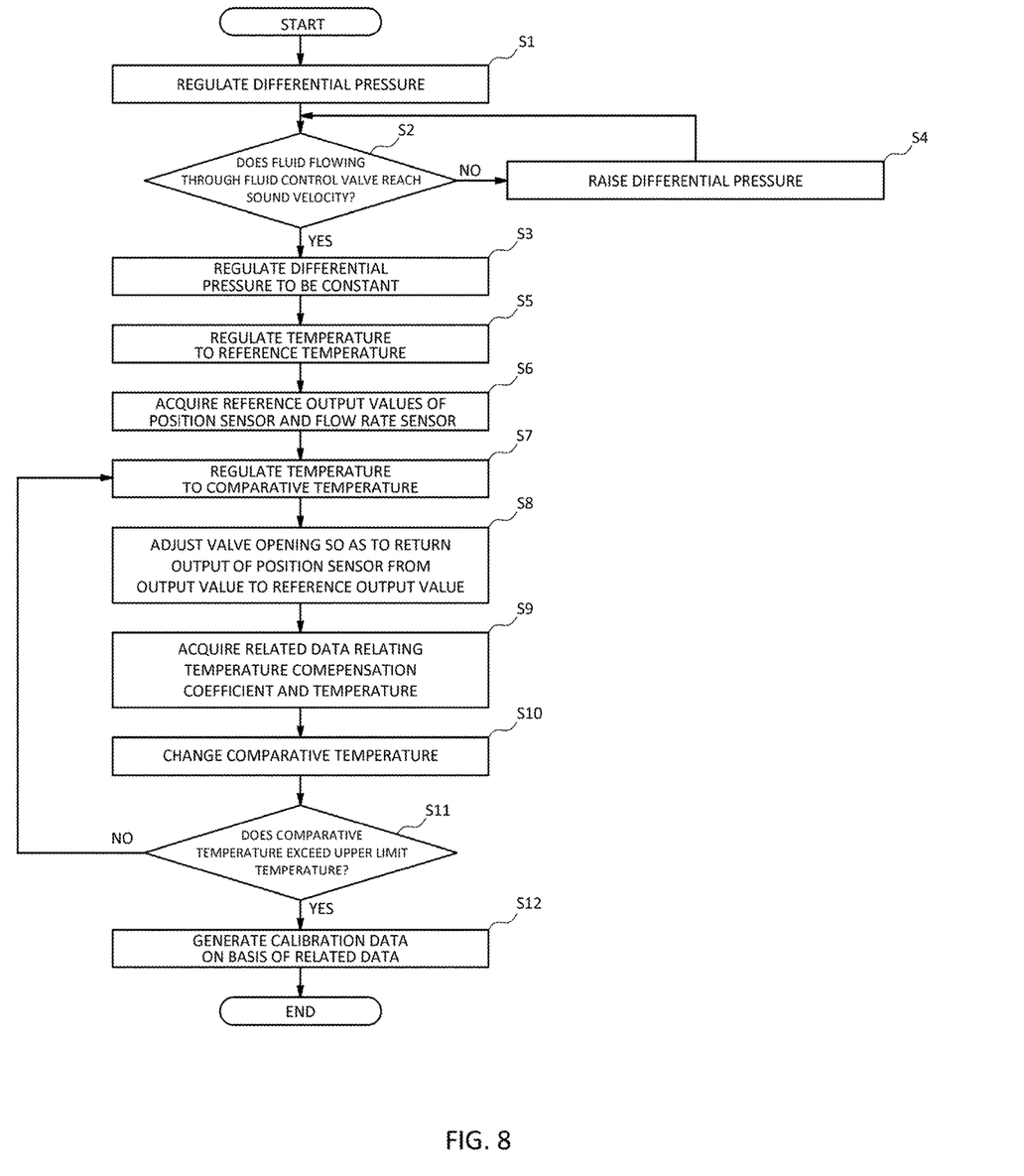
FIG. 8 is a flowchart illustrating the operation of the calibration data generation apparatus according to the second embodiment.

Next, the operation of the calibration data generation apparatus 100 according to the present embodiment will be described. Note that the calibration data generation apparatus 100 according to the present embodiment also performs the same operation as that of the calibration data generation apparatus 100 according to the first embodiment in Steps S1 to S8, and therefore description of these steps is omitted.

After the output value acquisition part 163' has acquired the reference output values from the position sensor PS and flow rate sensor 110 at the reference temperature, the valve opening control part 164' controls the valve opening of the fluid control valve 300 so as to return the output value outputted from the position sensor PS to the reference output value (Step S8). In this state, the related data acquisition part 166' substitutes the calibration data generation output value outputted from the flow rate sensor 110 and the reference valve opening into the theoretical expression to calculate the temperature compensation coefficient, and acquires the related data relating the temperature compensation coefficient and temperature (e.g., the comparative temperature or a change in temperature from the reference temperature to the comparative temperature) (Step S9). Note that Expression (3) includes a, and a represents the thermal expansion of the metal forming the valve seat. Accordingly, by using the temperature compensation coefficient calculated by the related data acquisition part 165', the valve opening can be obtained with the deviation of the output value of the position sensor PS from the output value at the reference temperature corrected, which includes the first deviation due to the temperature change of the position sensor PS itself and part of the second deviation due to the temperature change of respective members constituting the fluid control valve 300 (specifically the deviation due to the temperature changes of respective members that constitute the fluid control valve 300 and are other than the valve seat).

Then, Steps S7 to S9 are repeated while increasing the comparative temperature until the comparative temperature reaches the upper limit temperature, and the related data is obtained for each comparative temperature (Steps S10 and S11). Finally, when the comparative temperature reaches the upper limit temperature, the calibration data generation part 166' generates the calibration data on the basis of the related data (Step S12). In addition, the above operation is repeated while gradually increasing the initial valve opening of the fluid control valve 300 from near fully closing to near fully opening, and the calibration data is generated for each valve opening.

In addition, when the fluid control valve 300 for which the calibration data has been generated by the calibration data generation apparatus according to the present embodiment is used for the fluid control device 200, the initial valve opening corresponding to the predetermined flow rate target value can be calculated and set on the basis of the theoretical expression and the calibration data.

Other Embodiments

In the above-described embodiments, as the position sensor PS, an eddy current sensor is used, but a linear sensor may be used. In addition, a capacitive sensor may also be used. In this case, the capacitive sensor itself is not so affected by temperature, and therefore it is not possible to obtain an effect as high as that obtained when applying the present invention to an eddy current sensor.

Also, in the above-described embodiments, the calibration data is generated for the fluid control valve using the piezo element as an actuator. However, calibration data can also be generated for, for example, a fluid control valve using a solenoid coil as an actuator.

Further, in the above-described embodiment, as the flow rate control device 200, the thermal type mass flow controller is exemplified, but a pressure type mass flow controller may be used.

Still further, in the calibration data generation apparatus 100 in the above-described embodiments, the pressure on the upstream side of the fluid control valve 300 is controlled to control the differential pressure between the upstream and downstream sides of the fluid control valve 300. However, without limitation to this, only pressure on the downstream side may be controlled, or pressures on both of the upstream and downstream sides may be controlled.

Besides, it should be appreciated that the present invention is not limited to each of the above-described embodiments, but can be variously modified without departing from the scope thereof.

LIST OF REFERENCE CHARACTERS

100: Calibration data generation apparatus
200: Flow rate control device
300: Fluid control valve
400: Flow rate sensor
PS: Position sensor
10: Valve seat
30: Valve closure member
60: Temperature sensor
120: Temperature control mechanism
130: Differential pressure control mechanism
130*a*: Pressure control mechanism
140: Temperature sensor
150: Sound velocity sensing mechanism
151: Chamber
152: Pressure sensor
160: Control unit
161, 161': Differential pressure control part
162, 162': Temperature control part
163, 163': Output value acquisition part
164, 164': Valve opening control part
165, 165': Related data acquisition part
166, 166': Calibration data generation part
167, 167': Calibration data storage part
168': Theoretical expression storage part
210: Flow rate control unit
212: Calibration data storage part
213: Calibration part
214: Valve opening control part

The invention claimed is:

1. A calibration data generation apparatus that generates calibration data for a position sensor that is installed in a fluid control valve for controlling fluid and outputs an output value corresponding to a position of a valve closure member moving in a contacting/separating direction with respect to a valve seat, the calibration data generation apparatus comprising:
 a flow rate sensor that measures a flow rate of the fluid flowing through the fluid control valve;
 a pressure control valve that controls differential pressure between an upstream side and a downstream side of the fluid control valve;
 a heater that controls temperature of the fluid control valve; and
 a control unit that makes the pressure control valve control the differential pressure so that the fluid passing through the fluid control valve has sound velocity, and makes the heater change the temperature from a reference temperature to comparative temperature different from the reference temperature, wherein
 the control unit comprises:
  an output value acquisition part that acquires reference output values at the reference temperature, the reference output values being respectively outputted from the position sensor and the flow rate sensor;
  a valve opening control part that controls a valve opening of the fluid control valve so that in a state where the heater controls the temperature to the comparative temperature, an output value outputted from a first sensor of the position sensor and the flow rate sensor becomes equal to the reference output value of the first sensor; and
  a calibration data generation part that after the valve opening control part has controlled the valve opening of the fluid control valve, generates the calibration data on a basis of a calibration data generation output value outputted from a second sensor of the position sensor and the flow rate sensor.

2. The calibration data generation apparatus according to claim 1, wherein the valve opening control part is one that controls the valve opening of the fluid control valve so that an output value outputted from the flow rate sensor becomes equal to the reference output value of the flow rate sensor, and the calibration data generation part is configured to generate the calibration data on a basis of a calibration data generation output value outputted from the position sensor.

3. The calibration data generation apparatus according to claim 1, wherein the control unit further comprises:

a theoretical expression storage part that stores a theoretical expression representing a relationship among the flow rate of the fluid flowing through the fluid control valve, the valve opening of the fluid control valve, and a temperature compensation coefficient for the valve opening, wherein, the valve opening control part is one that controls the valve opening of the fluid control valve so that an output value outputted from the position sensor becomes equal to the reference output value of the position sensor, and the calibration data generation part is configured to generate the calibration data on a basis of a calibration data generation output value outputted from the flow rate sensor, a valve opening of the fluid control valve at the reference temperature that is predetermined, and the theoretical expression.

4. The calibration data generation apparatus according to claim 1, wherein the pressure control valve is arranged upstream of the fluid control valve and controls pressure on the upstream side to be constant.

5. The calibration data generation apparatus according to claim 4, wherein the flow rate sensor is arranged upstream of the pressure control device.

6. The calibration data generation apparatus according to claim 1, further comprising a sound velocity sensing mechanism that senses whether the fluid flowing through the fluid control valve reaches the sound velocity, wherein the sound velocity sensing mechanism comprises:

a chamber arranged on the downstream side of the fluid control valve;

a pressure sensor that measures pressure inside the chamber; and, a sound velocity sensing part that when after the fluid has been introduced into the chamber that was depressurized, an increase rate of a pressure value measured by the pressure sensor becomes constant, senses that the fluid flowing through the fluid control valve reaches the sound velocity.

7. A non-transitory program recording medium that stores control program used for a calibration data generation apparatus that generates calibration data for a position sensor that is installed in a fluid control valve for controlling fluid and outputs an output value corresponding to a position of a valve closure member moving in a contacting/separating direction with respect to a valve seat, the calibration data generation apparatus comprising: a flow rate sensor that measures a flow rate of the fluid flowing through the fluid control valve; a pressure control valve that controls differential pressure between an upstream side and a downstream side of the fluid control valve; a heater that controls temperature of the fluid control valve; and a control unit that in a state where the pressure control valve controls the differential pressure so that the fluid passing through the fluid control valve has sound velocity, uses the heater to change the temperature from a reference temperature to comparative temperature different from the reference temperature, the control program:

acquiring reference output values at the reference temperature, the reference output values being respectively outputted from the position sensor and the flow rate sensor;

controlling a valve opening of the fluid control valve, in a state where the heater controls the temperature to the comparative temperature, so that an output value outputted from a first sensor of the position sensor and the flow rate sensor becomes equal to the reference output value of the first sensor; and generating the calibration data on a basis of a calibration data generation output value outputted from a second sensor of the position sensor and the flow rate sensor.

8. A calibration data generation method that generates calibration data for a position sensor that is installed in a fluid control valve for controlling fluid and detects a value corresponding to a position of a valve closure member moving in a contacting/separating direction with respect to a valve seat, the calibration data generation method comprising:

changing temperature of the fluid control valve from a reference temperature to comparative temperature difference from the reference temperature to acquire reference output values at the reference temperature, the reference output values being respectively outputted from the position sensor and a flow rate sensor for measuring a flow rate through the fluid control valve in a state where differential pressure between an upstream side and a downstream side of the fluid control valve is controlled so that the fluid passing through the fluid control valve has sound velocity;

controlling a valve opening of the fluid control valve so that an output value outputted from a first sensor of the position sensor and the flow rate sensor becomes equal to the reference output value of the first sensor in a state where the fluid control valve is kept at the comparative temperature; and generating the calibration data on a basis of a calibration data generation output value outputted from a second sensor of the position sensor and the flow rate sensor after the valve opening of the fluid control valve has been controlled.

* * * * *